(Model.)
G. MILLER.
PUMP PISTON.
No. 254,357.  Patented Feb. 28, 1882.
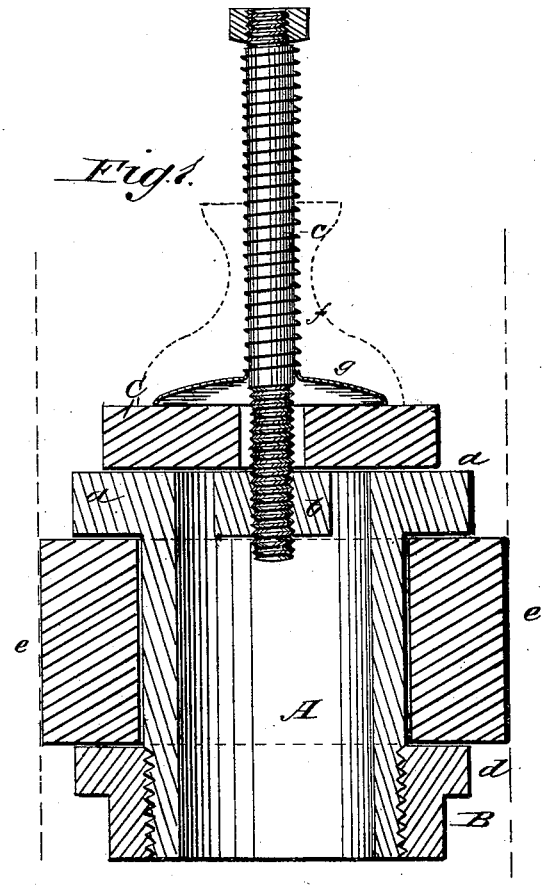
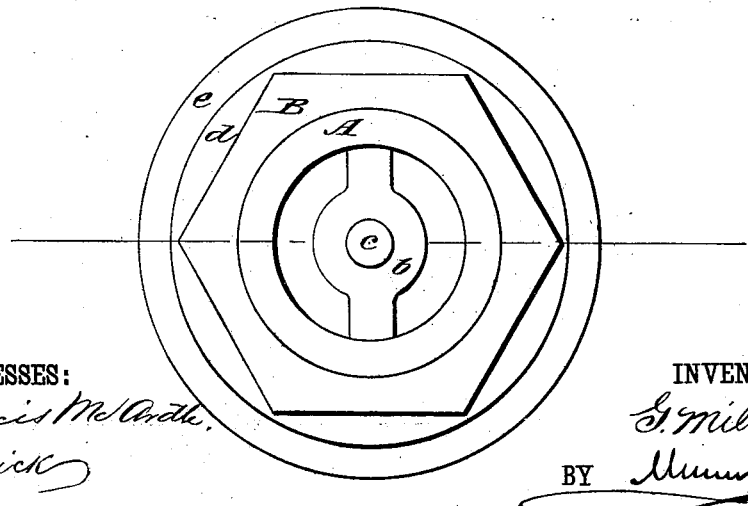
WITNESSES:
Francis McArdle
C. Sedgwick
INVENTOR:
G. Miller
BY Munn & Co
ATTORNEYS.

United States Patent Office.

GODFREY MILLER, OF ANITA, IOWA.

PUMP-PISTON.

SPECIFICATION forming part of Letters Patent No. 254,357, dated February 28, 1882.

Application filed November 11, 1881. (Model.)

*To all whom it may concern:*

Be it known that I, GODFREY MILLER, of Anita, Cass county, and State of Iowa, have invented a new and useful Improvement in Pump-Pistons, of which the following is a specification.

The object of my invention is to furnish a pump-piston of durable construction and with expansible packing.

The invention consists in a novel construction and arrangement of parts, as hereinafter described, and pointed out in the claims.

The upper end of the tubular head is fitted with a disk-valve, that constitutes the check-valve, and is pressed down by a spiral spring around the rod or piston.

In the accompanying drawings, Figure 1 is a vertical section, and Fig. 2 an inverted plan view, of my improved piston-head.

Similar letters of reference indicate corresponding parts.

A is a tubular casting, formed at one end with a radial flange or collar, $a$, and with a cross-bar, $b$, that is apertured to receive the screw end of the pump rod or piston $c$.

Upon the lower end of the head A is fitted a nut, B, that is formed with a collar or flange, $d$, of about the same diameter as the flange $a$ of the head.

Around the head A, between the flanges $a$ $d$, is a ring, $e$, of rubber, cork, or other elastic packing material, which is held in place by screwing the nut B against it. This ring $e$ extends beyond the flanges $a$ $d$, and is of a diameter for fitting snugly in the pump-barrel. As the packing $e$ becomes worn it can be expanded by screwing in the nut B, and the packing thus kept tight.

Upon the head is a circular disk, C, of rubber or similar material, which is apertured, so it may slide freely upon the rod $c$, and around the rod $c$ is fitted a spiral spring, $f$, that bears upon the concave washer $g$, that rests on the disk C. The washer $g$ covers the central aperture of the disk, and bearing, as it does, by its outer edge on the disk, the power of the spring is exerted to press the outer portion of disk C upon the flange $a$. This disk constitutes the suction or check valve of the head, which opens on the downward stroke of the piston to allow the water to pass through, and closes air-tight as the head rises.

The disk C may be a block of rubber of the form shown by dotted lines, and the spiral spring bear on a flat washer; or the spiral spring may be dispensed with and the rubber held by a nut above it.

I am aware that it is not broadly new to provide a piston with expansible packing and a spring-actuated disk-valve, and I therefore do not claim such; but What I do claim, and desire to secure by Letters Patent, is—

1. In a pump-piston, the combination, with the tubular casting A, provided with the cross-bar $b$ and the piston-rod $c$, of the valve C, sliding freely upon the piston-rod, the washer $g$, and the spiral spring $f$, surrounding the said piston-rod, substantially as and for the purpose set forth.

2. In a pump piston, the combination, with the tubular casting A, provided with the cross-bar $b$, the radial flange $a$, and the nut B, and the packing $e$, of the piston-rod $c$, the spring $f$, and the valve C, substantially as and for the purpose set forth.

GODFREY MILLER.

Witnesses:
M. BACH,
A. J. EARL.